United States Patent
Ermi et al.

(10) Patent No.: US 7,649,032 B2
(45) Date of Patent: Jan. 19, 2010

(54) HIGHLY DUCTILE POLYCARBONATE COMPOSITION HAVING A METALLIC-FLAKE APPEARANCE

(75) Inventors: Brett D. Ermi, Newburgh, IN (US); Sriramakrishna Maruvada, Evansville, IN (US); Niles Richard Rosenquist, Evansville, IN (US); Philippe Schottland, Evansville, IN (US)

(73) Assignee: SABIC Innovative Plastics IP B.V., Bergen op Zoom (NL)

( * ) Notice: Subject to any disclaimer, the term of this patent is extended or adjusted under 35 U.S.C. 154(b) by 764 days.

(21) Appl. No.: 11/015,274

(22) Filed: Dec. 17, 2004

(65) Prior Publication Data
US 2005/0261396 A1 Nov. 24, 2005

Related U.S. Application Data

(60) Provisional application No. 60/573,400, filed on May 21, 2004.

(51) Int. Cl.
*C08K 9/06* (2006.01)

(52) U.S. Cl. .............. 523/209; 523/212; 523/217; 524/494; 524/266; 526/196

(58) Field of Classification Search ............. 523/217, 523/209, 212; 524/494, 266; 526/196
See application file for complete search history.

(56) References Cited

U.S. PATENT DOCUMENTS

| 4,217,438 | A |   | 8/1980 | Brunelle et al. | |
| 5,436,077 | A | * | 7/1995 | Matsuba et al. | 428/404 |
| 5,455,310 | A | * | 10/1995 | Hoover et al. | 525/431 |
| 5,530,083 | A | * | 6/1996 | Phelps et al. | 528/25 |
| 5,753,371 | A |   | 5/1998 | Sullivan et al. | |
| H1975 | H |   | 7/2001 | Rosendale et al. | |
| 6,660,787 | B2 | * | 12/2003 | Mahood et al. | 524/164 |
| 2004/0030044 | A1 | * | 2/2004 | Okamoto et al. | 525/63 |

* cited by examiner

*Primary Examiner*—Robert D. Harlan

(57) ABSTRACT

A polycarbonate composition comprising a polycarbonate-polysiloxane copolymer resin and a glass flake additive wherein the polycarbonate-polysiloxane copolymer resin has a silicone content in the range of from 3.5 weight % to 7 weight % based on the total weight of the polycarbonate composition and wherein the polycarbonate-polysiloxane copolymer has a haze of less than 10% and wherein the glass flake additive is present in the range of 0.025 weight % to 0.70 weight % based on the total weight of the polycarbonate composition.

16 Claims, 4 Drawing Sheets

Figure 1
Effect of % Silicone on Notched Izod Ductility Using 0.5 weight % Glass Flake

| Example | % Silicone | MVR | Average Impact Strength (−20°C) | % Ductility (−20°C) | Average Impact Strength (23°C) | % Ductility (23°C) |
|---|---|---|---|---|---|---|
| 1* | 0 | 9.6 | 2.86 | 0 | 7.37 | 40 |
| 1 | 2.0 | 10.1 | 3.62 | 0 | 11.15 | 100 |
| 2 | 3.5 | 10.7 | 6.39 | 0 | 10.14 | 100 |
| 3 | 5.0 | 11.0 | 6.95 | 100 | 8.87 | 100 |
| 4 | 6.0 | 11.3 | 6.13 | 40 | 7.97 | 100 |

\* represents a comparative example

Figure 3
Effect of Glass Flakes on Notched Izod Ductility with and without PC-Si Copolymers

| Example | Wt % Si | % Glass Flake | MVR | Average Impact Strength (23°C) | % Ductility (23°C) | Average Impact Strength (-20°C) | % Ductility (-20°C) |
|---|---|---|---|---|---|---|---|
| 2* | 3.5 | 0 | 9.1 | 16.2 | 100 | 15.9 | 100 |
| 5 | 3.5 | 0.05 | 9.0 | 16.2 | 100 | 12.4 | 100 |
| 6 | 3.5 | 0.25 | 9.4 | 12.8 | 100 | 9.1 | 100 |
| 7 | 3.5 | 0.50 | 10.3 | 10.8 | 100 | 6.7 | 0 |
| 8 | 3.5 | 0.75 | 11.4 | 8.1 | 100 | 5.4 | 0 |
| 3* | 0 | 0.25 | 8.6 | 13.6 | 80 | 3.8 | 0 |
| 4* | 0 | 0.30 | 10.4 | 9.3 | 60 | -- | -- |
| 9 | 3.5 | 0.50 | 24.1 | 6.24 | 100 | 3.4 | 0 |
| 5* | 0 | 0.30 | 23.5 | 3.2 | 0 | -- | -- |

*represents a comparative example

Figure 4
Formulation Details for Examples

|  | 1 | 2 | 3 | 4 | 5 | 6 | 7 | 8 | 9 | 1* | 2* | 3* | 4* | 5* |
|---|---|---|---|---|---|---|---|---|---|---|---|---|---|---|
| Si-PC | 32.2 | 56.4 | 80.6 | 97.0 | 56.4 | 56.4 | 56.4 | 56.4 | 56.4 | 0 | 56.4 | 0 | 0 | 0 |
| PC 1 | 19.0 | 12.3 | 5.5 | 1.0 | 12.3 | 12.3 | 12.3 | 12.3 | 0 | 28.0 | 12.3 | 28.0 | 40 | 100 |
| PC 2 | 48.8 | 31.3 | 13.9 | 2.0 | 31.3 | 31.3 | 31.3 | 31.3 | 0 | 72.0 | 31.3 | 72.0 | 60 | 0 |
| PC-3 |  |  |  |  |  |  |  |  | 43.6 |  |  |  |  |  |
| % Glass Flake | 0.5 | 0.5 | 0.5 | 0.5 | 0.05 | 0.25 | 0.5 | 0.75 | 0.5 | 0.5 | 0 | 0.25 | 0.3 | 0.3 |
| % Si Target | 2 | 3.5 | 5 | 6 | 3.5 | 3.5 | 3.5 | 3.5 | 3.5 | 0 | 3.5 | 0 | 0 | 0 |
| Melt Flow | 10.1 | 10.7 | 11.0 | 11.3 | 9.0 | 9.4 | 10.3 | 11.4 | 24.1 | 9.6 | 9.1 | 8.6 | 10.4 | 23.5 |

HIGHLY DUCTILE POLYCARBONATE COMPOSITION HAVING A METALLIC-FLAKE APPEARANCE

CROSS-REFERENCE TO RELATED APPLICATIONS

This application claims priority to U.S. Provisional Application Ser. No. 60/573,400, filed May 21, 2004.

BACKGROUND OF THE INVENTION

This application relates to a transparent article having a metallic flake appearance and having a high impact performance at low temperature conditions. Specifically, this application relates to compositions that possess low temperature ductility comprising metal oxide-coated or metal-coated glass platelets dispersed within a transparent polysiloxane-polycarbonate copolymer resin matrix, methods to make such compositions and articles derived from these compositions and methods, which articles possess low temperature ductility.

As thermoplastics become increasingly important in the marketplace, producers have sought to differentiate their products by making them more visually exciting to the customer. One desirable look for thermoplastics is a metal flake appearance. This appearance can be described as the look one could imagine if small pieces of very shiny metal were dispersed in molten glass, and the glass subsequently cooled. The flakes have a bright metallic glint, but one can perceive clear spaces between the flakes such that these regions of the article are completely transparent.

United States Statutory Invention Registration, US H1975 H, describes a thermoplastic article having a metallic flake appearance and a means of producing a thermoplastic article having a metallic flake appearance by extruding a thermoplastic polymer together with an amount of metal-oxide coated glass platelets effective to provide a metal flake appearance.

Previous thermoplastic compositions with metal oxide-coated glass platelets possessed poor impact performance (i.e., resistance to shattering upon impact), especially when subjected to low temperature conditions. The cause of this poor impact performance was thought to be due to an interaction of the metal oxide-coated platelet with the thermoplastic resin. It was surmised that the metal oxide-coated platelets served as stress concentrators in an impact situation, leading to easy breakage of an article containing them. Even the use of a high impact strength thermoplastic resin, such as a polycarbonate resin, did not eliminate the breakage issue. The impact problem becomes more severe as the temperature of the surroundings is reduced and as the amount of metal platelets is increased.

The reduction of impact strength of thermoplastic articles, which contain metal oxide coated platelets adversely impacts their market acceptance and commercial growth. For example, the use of articles with a metal flake appearance in many automotive interior applications is substantially limited because automotive producers require that only high impact strength thermoplastics be used in automotive interiors to prevent shattered plastic from causing injury to passengers in an automobile accident. The loss of impact strength for articles with a metal-oxide coated platelets also limits their use in many outdoor applications, for example outdoor postal boxes, where low temperature impact performance is critical.

The compositions and methods according to the present invention provide articles with both the desirable metal flake appearance and the high impact performance especially in low temperature environments.

SUMMARY

It has been found that the impact performance of a polycarbonate composition containing metal oxide coated glass platelets with a metal appearance is improved when one or more polysiloxane-polycarbonate copolymer resins are present in the composition. This improvement is especially apparent at low temperatures where the compositions and methods of the present invention continue to provide high ductility.

Prior to applicants' invention it was assumed that the low temperature impact performance of transparent thermoplastic articles containing metal oxide-coated glass platelets could not be improved or could be improved only very slightly. The solutions presented herein substantially overcome the low temperature performance problems of thermoplastic articles containing metal oxide-coated platelets.

Disclosed herein are transparent high impact polycarbonate compositions containing metal oxide-coated glass platelets, methods for making said compositions, and articles made from said compositions. Articles made from said compositions exhibit exceptional low temperature impact performance.

In one embodiment of the invention, a high impact composition comprises a transparent polysiloxane-polycarbonate copolymer resin and a metal oxide-coated glass platelet additive. The polysiloxane-polycarbonate copolymer resin is a transparent composition comprising a polydimethylsiloxane blocks, wherein the polydimethylsiloxane blocks have degrees of polymerization of from 30 to 100 dimethylsiloxane moieties. The metal oxide-coated glass platelets must be sufficiently large and present in sufficient quantity to create the metal flake appearance but not so large or in such a high quantity that the article appears opaque and metallic. The dimethylsiloxane repeating units have a specific block length and are present in the composition in an amount sufficient so that the composition has relatively high ductility at −20° C.

In another embodiment the high impact composition comprises a transparent polydimethylsiloxane-polycarbonate copolymer resin and a metal oxide-coated glass platelet additive, wherein the weight % of the dimethylsiloxane repeating units is in the range of from 3.5% to 7% based on the total weight of the polycarbonate composition and the metal oxide-coated glass platelets with an aspect ratio of about 20:1.

In another embodiment the high impact composition comprises a blend of a transparent polydimethylsiloxane-polycarbonate copolymer resin and a second polycarbonate resin, wherein the polydimethylsiloxane block has a degree of polymerization between 40 and 60 repeating units, the weight % of the dimethylsiloxane repeating unit is in the range of from greater than 3.5% to 7% weight percent based on the total weight of the composition and the polydimethylsiloxane-polycarbonate copolymer resin is present in range of 55 to 98 weight % based on the total weight of the composition and further wherein the metal oxide-coated platelet additive is present in the range of 0.35 to 0.7 weight % based on the total weight of the composition In another embodiment the high impact composition comprises blend of a transparent polydimethylsiloxane-polycarbonate copolymer resin and a second polycarbonate resin, wherein polydimethylsiloxane block has a degree of polymerization between 40 and 60 repeating units, the weight % of the dimethylsiloxane repeating unit is in the range of from greater than 3.5% to 7% weight percent based on the total weight of the composition and the polydimethylsiloxane-polycarbonate copolymer resin is present in range of 55 to 98 weight % based on the total weight of the composition and wherein the second polycarbonate is bisphenol-A polycarbonate resin and further wherein the metal oxide-coated glass platelet additive is present in the range of 0.35 to 0.7 weight % based on the total weight of the composition.

In another embodiment a method for making the high impact composition comprises the steps of preparing a transparent polydimethylsiloxane-polycarbonate copolymer resin having a polydimethylsiloxane block length of 40 to 60 repeating units and a total dimethylsiloxane repeating unit content of 4-7% based on the total weight of the polydimethylsiloxane-polycarbonate copolymer resin, and combining said transparent polydimethylsiloxane-polycarbonate copolymer resin with a second polycarbonate and a metal oxide-coated glass platelet additive in an extruder.

In another embodiment a method for making the high impact composition comprises the steps of preparing a transparent polydimethylsiloxane-polycarbonate copolymer resin with a polydimethylsiloxane block length of 40 to 60 repeating units and a total dimethylsiloxane repeating unit content of 4-7% based on the total weight of the polydimethylsiloxane-polycarbonate copolymer resin, and combining said transparent polydimethylsiloxane-polycarbonate copolymer resin with a second polycarbonate wherein the second polycarbonate resin is bisphenol-A polycarbonate resin and a metal oxide-coated glass platelet additive in an extruder to produce and extruded pellet.

In other embodiments metal-coated glass platelet additives can be substituted for metal oxide-coated glass platelet additives.

In still other embodiments articles are molded from the high impact compositions and methods described above, said articles having a high ductility at −20° C.

BRIEF DESCRIPTION OF DRAWINGS

Referring now to the following Figures in which:

FIG. 1 is a table that compares the notched izod ductility measured at room temperature and −20° C. using the method of ASTM D 256-04 for 5 examples (including 1 comparative example) of polycarbonate copolymer compositions with various dimethylsiloxane contents and containing 0.5 weight % of a metal oxide-coated glass flake platelet additive.

FIG. 3 is a table that compares the notched izod ductility measured at room temperature and at −20° C. using the method of ASTM D 256-04 for 5 examples and including 4 comparative examples of polycarbonate copolymer compositions with 0 wt % or 3.5 wt % dimethylsiloxane contents at several different levels of a metal oxide-coated glass platelet additive and at several different melt flow values.

FIG. 4 is a table summarizing the formulation information for the examples included in FIGS. 1, 2, and 3.

DETAILED DESCRIPTION OF THE INVENTION

Figure 2:
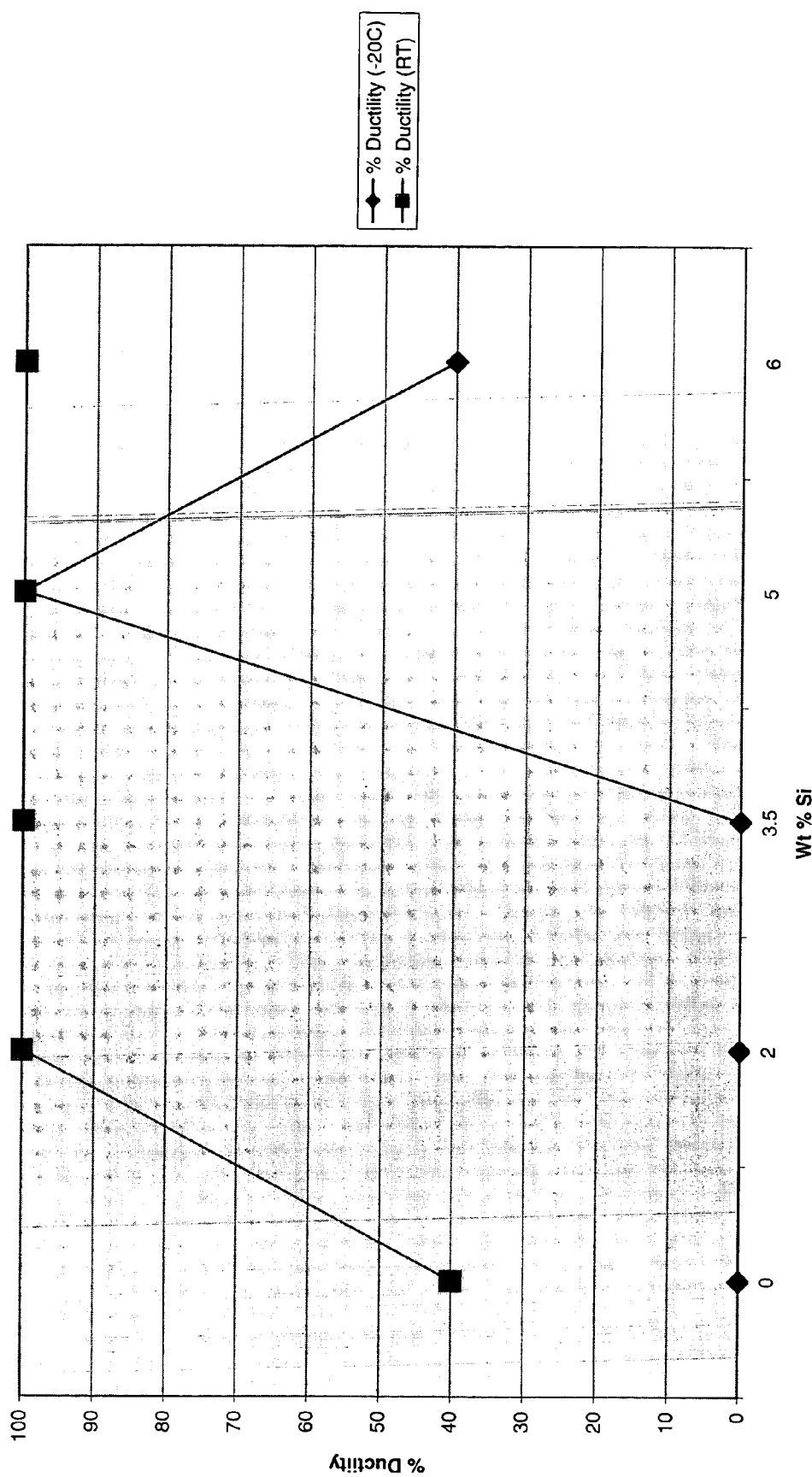
FIG. 2 is a graph that compares the −20° C. and room temperature notched izod ductility using the method of ASTM D 256-04 for compositions having various amounts of dimethylsiloxane contents made from blends of polydimethylsiloxane-polycarbonate copolymer resin and bisphenol-A polycarbonate resins and metal oxide-coated glass flake platelet additive (at 0.5 weight %).

As used herein, the term "impact" refers to notched izod ductility as measured on 0.125-inch izod bars using the method of ASTM D 256-04 at room temperature or −20° C., which is incorporated by reference herein. For the purposes of this application, the ASTM D 256-04 standard promulgated on is referred to throughout in reference to notched izod measurements.

As used herein, the terms "high impact at low temperature" or "high ductility" refers to 40% or more ductile breaks during testing of 0.125-inch izod bars using the method of ASTM D 256-04 at −20° C. Compositions that show high ductility at −20° C. are generally considered to be very useful in applications that require very high ductility at room temperature.

As used herein, the term "ductile break" refers to the manner in which the notched izod bar breaks under the conditions of the method of ASTM D 256-04 at 0.125 inch thick test part thickness. A "ductile break" refers to the manner of breaking in which the bar after breaking shows evidence of yield or deformation of the plastic near the notch. Frequently after a ductile break, the plastic part above the notch, remains attached to the part of the plastic bar below the notch in a hinged manner.

As used herein, the term "brittle break" refers to the manner in which the notched izod bar breaks under the conditions of the method of ASTM D 256-04 at 0.125 inch thick test part thickness. A "brittle break" refers to the manner of breaking in which the bar after breaking does not show any evidence of yield or deformation of the plastic near the notch. After a brittle break, the plastic part above the notch does not remain attached to the part of the bar below the notch and is cleanly separated from it.

As used herein, the term "% ductility" refers to the percentage of bars that undergo a "ductile break" under the conditions of the method of ASTM D 256-04. For example, under the conditions of ASTM D 256-04 as described in this application, 5 bars are tested. A 40% ductility indicates that 2 of the 5 bars tested broke in the manner of a "ductile break."

As used herein with respect to the invention, the term "haze" is used to describe the level of translucence and means that percentage of transmitted light which in passing through the specimen deviates from the incident beam by forward scattering (ASTM D 1003-00). As used hereinafter, transparency is defined as low haze, which means a haze value of 10% or less.

As used herein with respect to the invention, the % transmission means the ratio of transmitted light to incident light in accordance with Method E 308 (ASTM D 1003-00).

As used herein the term "moiety" refers to a part of a polymeric structure corresponding to a particular starting material, which may have lost atoms during the polymerization process. For example, a bisphenol-A moiety would correspond to a bisphenol-A without the hydrogen atoms of the two hydroxyl groups on the polymer.

As used herein the term "repeating unit" refers to a part of a copolymer structure corresponding to one repeating unit. For example a dimethylsiloxane unit would refer to one repeating segment corresponding to the chemical formula —[O—Si(CH$_3$)$_2$]— of the polydimethylsiloxane copolymer structure. A bisphenol-A carbonate repeating unit would refer to one repeating unit corresponding to the chemical formula —O [C6H4—C(CH)$_3$—C6H4—O—C(O)—O]—.

As used herein the term "article" designates any and all items that are formed from molding, extrusion, casting, lamination or otherwise processed items.

As used herein the term "transparent composition" refers to a composition that results in an article with less than 10% haze and greater than 50% transmission as measured on 0.125 in. A transparent article according to this definition could include other ingredients such as color additives that improve or enhance the glass metallic appearance.

All compositional percentages herein are given as weight percentages of the total composition unless described otherwise. For the formulations described in the table of FIG. 4 compositions are given as parts per hundred for the resins which total to one hundred parts. The remaining ingredients are in parts per hundred added to that hundred parts of resins.

Siloxane-polycarbonate block copolymers and their blends have been recognized for their low temperature ductility and flame retardancy and may also be utilized as a matrix for incorporating pigments and other additives useful for creating a variety of color effects and appearances. One general method for forming these block copolymers is by introducing phosgene under interfacial reaction conditions into a mixture of a dihydric phenol, such as BPA, and a hydroxyaryl-terminated polydiorganosiloxane.

Hydroxyaryl-terminated polydiorganosiloxanes may be prepared in the manner described in U.S. Pat. No. 5,530,083. Some non-limiting examples of the aliphatically unsaturated monohydric phenols which can be used to make the hydroxyaryl-terminated polydiorganosiloxanes are: 2-methoxy-4-alkylphenol (also known as eugenol), 2-allylphenol, 4-allyl-2-methylphenol, 4-allyl-2-phenylphenol, 4-allyl-2-bromophenol, 4-allyl-2-t-butoxyphenol, 2-methyl-4-propargylphenol, 2-allyl-4,6-dimethylphenol, 2-allyl-4-bromo-6-methylphenol, 2-allyl-6-methoxy-4-methylphenol and 2-allyl-4,6-dimethylphenol. Some non-limiting examples of the hydroxyaryl-terminated polydiorganosiloxanes used in this invention are phenol-siloxanes included within the formula of structure 1

Structure 1

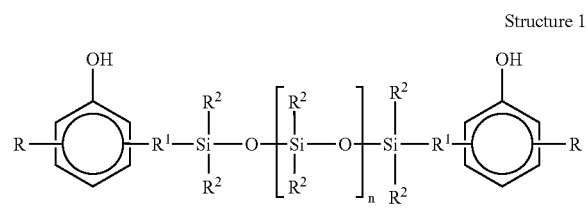

where each R may be the same or different and is selected from the group of radicals consisting of hydrogen, halogen, $C_{(1-8)}$ alkoxy, $C_{(1-8)}$ alkyl and $C_{(6-13)}$ aryl, $R^1$ is a $C_{(2-8)}$ divalent aliphatic radical, $R^2$ is selected from the same or different $C_{(1-13)}$ monovalent organic radicals, and n is an integer greater than or equal to 1, preferably greater than or equal to 6, more preferably 10, more preferably greater than or equal to 25, and most preferably greater than or equal to 40. It is also preferred to have n be an integer less than or equal to 1000, preferably less than or equal to 100, more preferably less than or equal to 75, and most preferably less than or equal to 60. In one embodiment n is less than or equal to 50. In another embodiment, n is an integer from 30 to 60. As used hereinafter, diorganosiloxy units are defined as the portion —[$R^2$—SiO—$R^2$]— of the formula shown above. Preferred hydroxyaryl-terminated polydiorganosiloxanes are those where $R^2$ is methyl and R is hydrogen or methoxy and is located in the ortho position to the phenolic substituent and $R^1$ is propyl and is located ortho or para to the phenolic substituent.

Typical chainstoppers (i.e., mono-functional chemicals useful to stop polymer chain growth) may be used, such as p-cumylphenol. Some non-limiting examples of chainstoppers include phenol, p-tert-butylphenol, p-cumylphenol, cardinol, octylphenol, nonylphenol and other agents that are well known in the art or any combination of these.

Suitable organic solvents, which can be used are, for example, chlorinated aliphatic hydrocarbons, such as methylene chloride, chloroform, carbon tetrachloride, dichloroethane, trichloroethane, tetrachloroethane, dichloropropane and 1,2-dichloroethylene; substituted aromatic hydrocarbons such as, chlorobenzene, o-dichlorobenzene, and the various chlorotoluenes. The chlorinated aliphatic hydrocarbons, especially methylene chloride, are preferred.

Aqueous alkali, or alkaline earth metal hydroxide addition can be used to maintain the pH of the phosgenation mixture near the pH set point. Some non-limiting examples of the alkali metal or alkaline earth metal hydroxides, which can be employed are sodium hydroxide, potassium hydroxide, and calcium hydroxide. Sodium and potassium hydroxides, and particularly sodium hydroxide are preferred. The pH can be regulated by recirculating the reaction mixture past a pH electrode which regulates the rate of addition of the aqueous alkali metal or alkaline earth metal hydroxide.

While several methods are known that are particularly effective in making transparent polysiloxane-polycarbonate copolymers one method is as follows. A reactor was charged with a portion of an aromatic dihydroxy compound (such as BPA), water, and an organic solvent (such as a chlorinated aliphatic organic liquid, such as methylene chloride) and was phosgenated in the presence of a phase transfer catalyst, PTC, (such as a methyltributylammonium salt) at a pH of 3-8, preferably 6-7, to form bischloroformate oligomers. At this stage it was found to be important not to add co-catalysts such as trialkyl amines although in production small quantities may be present as an impurity. To this mixture was added a hydroxyaryl-terminated polydiorganosiloxane (such as eugenol-capped siloxane, 2-allylphenol capped siloxane, isopropenylphenol capped siloxane, or 4-hyroxystyrene capped siloxane), which was allowed to react at a pH of 10-14, preferably 10.5, for a period of time ranging from 5-60 minutes, preferably 10 to 30 minutes. It is somewhat preferred to add the polydiorganosiloxane before raising the pH, but the pH should be achieved relatively quickly (approximately a minute or two). It is also possible to raise the pH during or after addition of the polydiorganosiloxane. The remaining BPA was then added, and the disappearance of chloroformates was monitored by phosgene paper. When less than 50 ppm, preferably less than 1 ppm, of chloroformates remain, the chainstopper and a co-phosgenatings catalyst, such as a trialkylamine, were added and the reaction phosgenated to completion at a pH of 9-12, preferably 9.5-11.5, more preferably 10-11. The time of reaction will depend upon the equipment used and the rate of phosgene addition, etc. If the reaction is allowed to progress too long, to the point where chloroformates disappear altogether, hydrolysis of the polymer will begin, and this should be avoided as it will result in a decreased molecular weight. The optimal time for maximum molecular weight build short of hydrolysis may be determined by trial and error. Simply varying the time versus molecular weight. Next the resulting resin was purified. For example, the resin was centrifuged to remove the brine phase, followed by two acid washes, 4 water washes and a final water strip. The chloride-free resin was then steam-precipitated and dried.

Some non-limiting examples of the preferred phase transfer catalysts, PTC, which can be utilized in the practice of the present invention are:

where $R^3$ is a member selected from the same or different, $C_{(1-10)}$ alkyl groups, Q is nitrogen or phosphorus, and X is a halogen or an —OR⁴ group, where R⁴ is hydrogen, a $C_{(1-8)}$ alkyl group or a $C_{(6-8)}$ aryl group. Some non-limiting examples of the phase transfer catalysts (PTC) that can be used in the practice of the invention are,

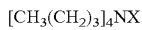
[CH₃(CH₂)₃]₄NX

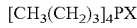
[CH₃(CH₂)₃]₄PX

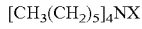
[CH₃(CH₂)₅]₄NX

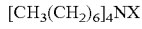
[CH₃(CH₂)₆]₄NX

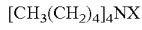
[CH₃(CH₂)₄]₄NX

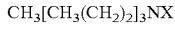
CH₃[CH₃(CH₂)₂]₃NX

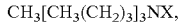
CH₃[CH₃(CH₂)₃]₃NX, where X is selected from Cl⁻, Br⁻ or —OR⁴, where R⁴ is hydrogen, a $C_{(1-8)}$ alkyl group or a $C_{(6-18)}$ aryl group. An effective amount of a PTC is 0.1% to 4 mol %, and preferably 0.25% to 2 mol % relative to the aromatic dihydroxy compound in the phosgenation mixture. A preferred PTC is methyltributylammonium chloride salt (MTBA).

Some non-limiting examples of the aromatic dihydroxy compounds include menthane bisphenols (BHPM), such as 4,4'-[1-methyl-4-(1-methyl-ethyl)-1,3-cyclohexandiyl]-bisphenol, 1,3-bis-hydroxyphenyl menthane (referred to as 1,3-BHPM), and 2,8-di-(4-hydroxyphenyl)menthane (referred to as 2,8-BHPM); bis(hydroxyaryl)alkanes, such as bis(4-hydroxyphenyl)methane; 1,1-bis(4-hydroxyphenyl)ethane; 2,2-bis(4-hydroxyphenyl)propane (also known as Bisphenol A); 2,2-bis(4-hydroxyphenyl)butane; 2,2-bis(4-hydroxyphenyl)octane; bis(4-hydroxyphenyl)phenylmethane; 2,2-bis(4-hydroxy-1-methylphenyl)propane; 1,1-bis(4-hydroxy-t-butylphenyl) propane; and 2,2-bis(4-hydroxy-3-bromophenyl)propane, bis(hydroxyaryl)cycloalkanes, such as 1,1-(4-hydroxyphenyl)cyclopentane, 1,1-bis-(4-hydroxyphenyl)-3,3,5-trimethylcyclohexane (referred to as BPI) and 1,1-bis(4-hydroxyphenyl)cyclohexane, dihydroxyaryl ethers, such as 4,4'-dihydroxydiphenyl ether and 4,4'dihydroxy-3,3'-dimethylphenyl ether, dihydroxydiaryl sulfides, such as 4,4'-dihydroxydiphenyl sulfide and 4,4'-dihydroxy-3,3'-dimethyldiphenyl sulfide, dihydroxydiaryl sulfoxides, such as 4,4'-dihydroxydiphenyl sulfoxide and 4,4'-dihydroxy-3,3'-dimethyldiphenyl sulfoxide, dihydroxydiaryl sulfones, such as 4,4'-dihydroxydiphenyl sulfone and 4,4'-dihydroxy-3,3'-dimethyldiphenyl sulfone, SBI (6,6'-dihyroxy-3,3,3',3'-tetramethyl spiro(bis)indane)("spirobiindane bisphenol"), CD-1 (3-(4-hydroxyphenyl)-1-1,3-trimethyl-indan-5-01), fluorenone bisphenol, TMBPA (tetramethyl BPA), and cyclododecaneone bisphenol. In an exemplary embodiment of the invention, the aromatic dihydroxy compound used is Bisphenol A (BPA).

The aromatic dihydroxy compound may also be a high heat monomer such as, for example, phenol phthalein, 2 methyl-3,3-bis (p-hydroxyphenyl) phthalimide; 2-butyl-3,3-bis (p-hydroxyphenyl) phthalimide, 2-octyl-3,3-bis (p-hydroxyphenyl) phthalimide; 2-phenyl-3,3-bis (p-hydroxyphenyl) phthalimide and the like as disclosed in U.S. Pat. No. 5,455,310.

The polycarbonate-polysiloxane copolymer can be made in a wide variety of either semi-batch or continuous flow reactors. Such reactors are, for example, stirred tank reactors, which may be either semi-batch or continuous flow. Additional reactors which are included are agitated column and recirculating loop continuous reactors.

The volume ratio of aqueous to organic phase during and at the termination of the phosgenation reaction can be in the range of about 0.2-1:1. Reaction temperatures can be in the range of between about 15-50° C. When methylene chloride is used, the reaction may be conducted at reflux which can be 35-42° C. The reaction can be conducted at atmospheric pressures, although sub- or super-atmospheric pressures may be employed if desired.

During phosgenation, the mixture is preferably agitated, such as, by using a stirrer or other conventional equipment. The phosgenation rate can be varied depending on other reaction conditions.

In order to avoid premature precipitation of alkali metal salt, such as sodium chloride in particular instances, there can be added sufficient aqueous solvent, such as de-ionized water, to preclude a build-up in salt concentration exceeding 25% by weight of the aqueous phase.

Recovery of the polycarbonate-polysiloxane copolymer can be achieved by conventional means, such by the use of an anti-solvent, or steam precipitation or gel-crush methods. Preferably, the resin is centrifuged to remove the brine phase, followed by acid washes and water washes and a final water strip. Even more preferably, the resin is centrifuged to remove the brine phase, followed by two acid washes, 4 water washes and a final water strip. Preferably, the chloride-free resin is then steam-precipitated and dried.

The polysiloxane-polycarbonate block copolymers have a weight-average molecular weight (Mw, measured, for example, by Gel Permeation Chromatography, ultra-centrifugation, or light scattering) of greater than or equal to about 10,000, preferably greater than or equal to about 20,000. Also preferred is a weight average molecular weight of less than or equal to about 200,000, preferably less than or equal to about 100,000. It is generally desirable to have the polyorganosiloxane units contribute about 0.5 to about 80 wt % of the total weight of the siloxane-polycarbonate copolymer. The chain length of the siloxane blocks corresponds to about 10 to about 100 chemically bound organosiloxane units.

As used in hereafter with respect to the invention, Mw stands for weight-averaged molecular weight determined by gel permeation chromatography using polycarbonate standards. Mn refers to number-averaged molecular weight, MWD refers to molecular weight distribution, and disp. refers to polydispersity.

As used herein, the term "polycarbonate" includes polymers having structural units of the structure 2:

(Structure 2)

in which at least about 60 percent of the total number of R¹ groups are aromatic organic radicals and the balance thereof are aliphatic, alicyclic, or aromatic radicals. Preferably, R¹ is an aromatic organic radical and, more preferably, a radical of the structure 3 II:

-A¹-Y¹-A²-    (Structure 3)

wherein each of A¹ and A² is a monocyclic divalent aryl radical and Y¹ is a bridging radical having zero, one, or two atoms which separate A¹ from A². In an exemplary embodiment, one atom separates A¹ from A². Illustrative, non-limiting examples of radicals of this type are —O—, —S—, —S(O)—, —S(O₂)—, —C(O)—, methylene, cyclohexylmethylene, 2-[2,2,1]-bicycloheptylidene, ethylidene, isopropylidene, neopentylidene, cyclohexylidene, cyclopentadecylidene, cyclododecylidene, adamantylidene, and the like. In another embodiment, zero atoms separate $A^1$ from $A^2$, with an illustrative example being biphenol (OH-phenyl-phenyl-OH). The bridging radical $Y^1$ can be a hydrocarbon group or a saturated hydrocarbon group such as methylene, cyclohexylidene or isopropylidene.

Polycarbonates can be produced by the reaction of dihydroxy compounds in which only one atom separates $A^1$ and $A^2$. As used herein, the term "dihydroxy compound" includes, for example, bisphenol compounds having general structure 4 as follows:

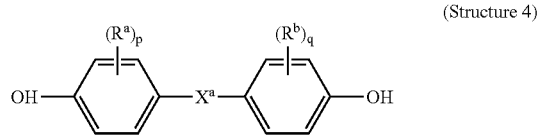

(Structure 4)

wherein $R^a$ and $R^b$ each independently represent hydrogen, a halogen atom, or a monovalent hydrocarbon group; p and q are each independently integers from 0 to 4; and $X^a$ represents one of the groups of structure 5:

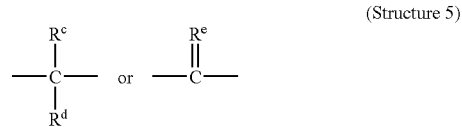

(Structure 5)

wherein $R^c$ and $R^d$ each independently represent a hydrogen atom or a monovalent linear or cyclic hydrocarbon group, and $R^e$ is a divalent hydrocarbon group.

Some illustrative, non-limiting examples of suitable dihydroxy compounds include dihydric phenols and the dihydroxy-substituted aromatic hydrocarbons such as those disclosed by name or formula (generic or specific) in U.S. Pat. No. 4,217,438. A nonexclusive list of specific examples of the types of bisphenol compounds that may be represented by structure 4 includes the following: 1,1-bis(4-hydroxyphenyl) methane; 1,1-bis(4-hydroxyphenyl) ethane; 2,2-bis(4-hydroxyphenyl) propane (hereinafter "bisphenol A" or "BPA"); 2,2-bis(4-hydroxyphenyl) butane; 2,2-bis(4-hydroxyphenyl) octane; 1,1-bis(4-hydroxyphenyl) propane; 1,1-bis(4-hydroxyphenyl) n-butane; bis(4-hydroxyphenyl) phenylmethane; 2,2-bis(4-hydroxy-1-methylphenyl) propane; 1,1-bis(4-hydroxy-t-butylphenyl) propane; bis(hydroxyaryl) alkanes such as 2,2-bis(4-hydroxy-3-bromophenyl) propane; 1,1-bis(4-hydroxyphenyl) cyclopentane; 4,4'-biphenol; and bis(hydroxyaryl) cycloalkanes such as 1,1-bis(4-hydroxyphenyl) cyclohexane; and the like as well as combinations comprising at least one of the foregoing bisphenol compound.

It is also possible to employ polycarbonates resulting from the polymerization of two or more different dihydric phenols or a copolymer of a dihydric phenol with a glycol or with a hydroxy- or acid-terminated polyester or with a dibasic acid or with a hydroxy acid or with an aliphatic diacid in the event a carbonate copolymer rather than a homopolymer is desired for use. Generally, useful aliphatic diacids have about 2 to about 40 carbons. A preferred aliphatic diacid is dodecandioic acid.)

Blends may be prepared according to mixing techniques well known in the art. In general, the different components of the blend are dry mixed mechanically (blenders/high speed mixers), fed to an extruder where the different resins are melted, and the different phases of the blend will get dispersed.

Among the polycarbonates, which can be blended with the polycarbonate-polysiloxane copolymer, are those formed by phosgenating bisphenols as previously described and preferably bisphenol A (BPA). Additional procedures, which can be used to make polycarbonates useful in blending with polycarbonate-polysiloxane copolymer, include polycarbonate made by ester interchange under melt polymerization conditions. By way of non-limiting example, the polycarbonate-polysiloxane copolymer can be blended with other polymers such as polycarbonates, BHPM homopolymer, copolycarbonates, copolyestercarbonates and polyesters which are illustrated by but not limited to the following: bisphenol A polycarbonate, BCC polycarbonate, BPZ (1,1,-bis(4-hydroxyphenyl)cyclohexane ("cycoloyhexanone bisphenol")) polycarbonate, copolycarbonates of BPA and BPI, BPA-dodecanedioic acid copolyestercarbonate, polyethylene terephthalate, SBI (6,6'-dihydroxy-3,3,3'3'-tetramethylsprio (bis)indane ("spirobiindane bisphenol")), CD-1 (3-(4-hydroxyphenyl)-1,1,3-trimethyl-indan-5-01)), TMBPA (2,2-bis(3,5-dimethyl-4-hydroproxyphenyl)propane ("tetramethyl BPA")), 1,3-BHPM, and 2,8-BHPM. It is also possible to blend the polycarbonate with other polymers.

One method by which metal oxide-coated glass platelets are made is by first stretching a molten C borosilicate glass into sheets, beads or glass tubes, followed by crushing this glass into flakes. In one embodiment C glass is used that is resistant to corrosion by acid and moisture due to its tin oxide content. E glass can also be used. Typically these glass flakes are coated by dispersing them into water at a concentration of 10 to 20%. Next, an appropriate metal oxide source is added while maintaining the pH at an appropriate level (by adding a base) to cause precipitation of hydrous metal oxide on the glass flake. Common metal oxide coatings including titanium dioxide, tin oxide and iron oxide. An acid is typically added and the flakes are washed and subsequently calcined. Suitable metal oxide-coated glass platelets and methods for making them are described in U.S. Pat. No. 5,753,371. A second example of a solution coating method is described in U.S. Pat. No. 5,436,077. In this method, the metal layer is formed by treating the glass flakes with metal alkoxides in an aqueous alkaline solution of water and an alcohol, followed by isolation and a firing step.

Metal-coated glass flakes can also be used alone or in combination with metal oxide-coated glass flakes. These can be obtained by the deposition of a metal layer on E or C glass flakes by chemical or physical metal vapor deposition, or by electroless plating.

Metal coating layers may vary in thickness between about 35 to about 500 nm. Metals useful for coating glass include, but are not limited to, gold, silver, platinum, nickel, copper, chromium, zinc and alloys thereof. Metal layers can deteriorate, if exposed to certain environments (e.g. corrosive conditions), and this can lead to a decrease in the reflectivity of the flake or the formation of color and appearance defects (e.g. pits). One means to reduce this deterioration is to employ a transparent protective metal oxide layer on the surface of the metal layer. The protective layer is generally made of $SiO_2$ with a thickness ranging from about 10 nm to about 1000 nm. To obtain the highest protection of the metal layer, the protective layer is often continuous.

When a glass flake is coated with a silver or silver oxide layer without any additional protective coating layer, silver ions could be released in the presence of humidity. Silver ions are known for their bactericide activity. Using such flake in the resin composition could help with the elimination of bacteria and fungi that could grow on the surface of thermoplastic articles.

In one embodiment of the present invention metal oxide-coated glass platelets with average aspect ratios (a measurement of the length of the platelet to the thickness of the platelet as measured in microns) from 3:1 to 80:1 are employed. In another embodiment of the present invention metal oxide-coated glass platelets with average aspect ratios of from 10:1 to 30:1 are employed. In another embodiment of the present invention metal oxide-coated glass platelets with an average aspect ratio of 20:1 is employed.

In one embodiment platelet loadings in the range of 0.005 to 5 percent by weight of the transparent matrix are used. In another embodiment platelet loadings in the range of 0.01 to 1 percent by weight of the transparent matrix are used. If the loading is too low, the metal-oxide coated platelets appearance will not be observable, and if the loading is too high then the entire article will seem metallic. The particle size of the glass platelets is generally from about 30 to about 200 microns with an average particle size of about 100 microns and an aspect ratio (length:thickness) of about 20:1. The thickness of the glass platelets can range from about 1 to about 5 microns. Thinner glass platelets can be used but have a greater tendency to break apart in a mixing or extrusion process.

To prepare the resin compositions of the invention, the components may be mixed by any known methods which include dry mixing all or part of the ingredients of the composition in a tumbler mixer or a ribbon blender or a Henschel mixer and then feeding the mixture together with the remaining ingredients into an extruder or feeding the platelets or a mixture of the platelets and other ingredients of the composition downstream in the extruder after the polymer melts to form pellets. Suitable extruders types are twin screw or single screw for the various addition methods. Another alternative embodiment is to form a concentrate of pellets comprising platelets dispersed in the matrix wherein the platelets are at a higher concentration than the finished pellets. The concentrates are then fed into the feed section of a single or twin screw extruder together with the additional ingredients in the composition to form finished pellets having the desired concentration of the platelets. Alternatively the concentrated pellets can be added downstream from the feed section into the molten polymer.

The compositions of the invention may further comprise additives as is known in the art such as heat stabilizers, color stabilizers, lubricants, flow-improving agents, plasticizers, anti-oxidants, anti-static agents, mold release agents, flame retarding agents, weathering agents, UV stabilizers which can be present in the polycarbonate composition or applied as a "hard coat" protective layer, or any combination of colorants, pigments, or color effect additives.

The data in FIG. 1 illustrates the benefits, in notched izod impact performance, which result from the use of polysiloxane-polycarbonate copolymer resins in combination with metal oxide-coated glass platelet additives (examples 1-4). These results should be compared with the lower notched izod impact, which results when only bisphenol-A polycarbonate is used (comparative example 1*). The observed benefits are seen at room temperature and at low temperature −20° C.

From the table of data in FIG. 1 and the graph in FIG. 2 a highly unusual and unexpected relationship exists between the amount of siloxane present and the low temperature impact performance of the polycarbonate composition containing the metal oxide-coated glass platelets. At 3.5 weight % or less siloxane, the molded articles are brittle at −20° C. But, the −20° C. impact performance rapidly increases to 100% ductile behavior at 5 weight % siloxane and then surprisingly declines in ductility becoming 40% ductile at 6 weight % siloxane content. This behavior was not seen during room temperature testing of the same samples as illustrated in FIG. 1 and FIG. 2.

The low temperature ductility behavior of the platelet containing formulations within the range of 3.5 to 7 weight % siloxane is different from the low temperature ductility behavior of polycarbonate siloxane copolymer blends that did not comprise metal-oxide glass platelet additive. In contrast, as shown in FIGS. 1 and 2, the platelet-free blends of polysiloxane-polycarbonate copolymer resin and polycarbonate did not show a clear trend in low temperature ductility in the range of 3.5 to 7 wt % siloxane.

The data in the table identified as FIG. 3, shows that the glass flake content of the formulation also influences the low temperature impact performance of the polycarbonate compositions of the present invention. Examples 5-9 and comparative example 2* illustrate that 100% ductility is observed at −20° C. for dimethyl siloxane contents of 3.5 weight % when the glass flake content is from 0 to 0.25 weight %, but the molded articles become brittle when the glass flake is 0.5 weight % or greater. Example 9 in FIG. 3 and the comparative Example 5* also point out that room temperature ductility of the metallic appearance is improved even when very high flow matrix resin formulations are employed.

One skilled in the art would be able to recognize from the data presented in FIGS. 1, 2 and 3 that an unexpected relationship exists between glass flake content and siloxane content in the polycarbonate formulations of the present invention. To successfully employ the methods of the present invention to produce articles that possess both the desired appearance and are ductile at low temperatures both glass flake content and siloxane content need to be optimized in the formulations. One skilled in the art would be able with the method of the present invention to identify the best balance of low temperature ductility and appearance through standard methods of formulation optimization. One such method is formulation screening in which a series of formulations are made and properties tested in order to incrementally locate the composition or compositions that possess the desired property balance. A second method uses statistical optimization methods such as a design of experiments to optimize compositions.

Preparation Method for Polysiloxane-Polycarbonate Copolymer Resins: A method for forming the polysiloxane-polycarbonate copolymers of the present inventions is as follows:

A glass lined reactor is charged with 500 gal deionized water, 4 gal MTBA catalyst solution (aqueous solution of methyltributylammonium chloride, 75% solids), 2250 lbs bisphenol-A (BPA), 3 lbs sodium gluconate, 55 lbs p-cumylphenol, and 1300 gal dichloromethane. The mixture is allowed to stir for 5 minutes. Phosgene addition is initiated, with rapid agitation and recirculation of the mixture while the pH is maintained between 4 and 7, by 50% aqueous sodium hydroxide addition. Heat generated by the reaction is removed through boiling of the dichloromethane solvent, which is then condensed and returned to the reactor. At the completion of phosgene addition (1675 lbs, about 15 minutes addition time), the pH, molecular weight, and levels of free bisphenol-A and chloroformates in the aqueous phase are measured. The oligomer MW must be less than 5000 and the chloroformate concentration greater than 0.1 mole/liter at this point in the process. The pH of the resin reactor is raised to 12 with 50% aqueous sodium hydroxide solution. 340 lbs Eugenol-stopped D45 siloxane fluid is added over 20 minutes with rapid agitation and recirculation of the mixture, and allowed to react for an additional 10 minutes, with the pH maintained at 11. A second formulation of 300 gal deionized water, 600 gal dichloromethane, 2250 lbs bisphenol-A, 123 lbs p-cumylphenol and 15 lbs triethylamine (polymerization catalyst) is added to the resin reactor. A second phosgene addition step of 1125 lbs phosgene is performed using the same procedure described above while the pH is maintained between 10 and 11 by 50% aqueous sodium hydroxide addition. The level of free BPA in the aqueous phase is again measured. Additional phosgene is added if greater than 25 ppm bisphenol-A is found. Once free monomer is within specification, the reaction mixture is discharged to the centrifuge feed tank.

The centrifuge feed tank mixture consists of two immiscible layer, one organic and containing the polymer product and one aqueous containing high levels of sodium chloride. This mixture is separated using a liquid/liquid centrifuge and the polymer solution is then washed with aqueous hydrochloric acid solution (to remove triethylamine catalyst; MTBA catalyst will partition to the aqueous layer) using a liquid/liquid centrifuge. The polymer solution is then washed twice with water using a liquid/liquid centrifuge. The final polymer product is isolated as a fine white powder by steam precipitation from dichloromethane solution then dried at 120° C. in a nitrogen fluidized bed. Dry resin (<0.5% moisture) is discharged from the dryers to storage silos.

Notched Izod measurements were conducted according to the method of ASTM D 256-04 on test bars that measured 0.125 in thickness by 0.5 in wide and 2.5 long at room temperature (23° C.) and low temperature (−20° C. or −40° C.).

Melt flow measurements were carried out on extruded pellets employing the method described in ASTM D 1238-04) using a weight of 1.2 kg at 300° C.

Preparation Method for Blends with Metal Oxide-coated glass flake Additives: Blend compositions were obtained in pellet form using conventional twin screw extrusion methods well known in the art. The polycarbonate resins, PC-1 (weight averaged molecular target of 30,000 as measured by gel permeation chromatography using polycarbonate standards) and PC-2 (weight average molecular weight target of 21,800 as measured by gel permeation chromatography using polycarbonate standards), were used to achieve the range of melt flows. The metal-oxide coated glass flake additives used in the examples are known commercially as Firemist White Pearl 9G130L obtained from Englehard Cooporation. The metal-oxide coated glass flake additives were introduced in a pellet concentrate form which was prepared by conventional extrusion methods from glass flake platelets and bisphenol-A polycarbonate such that targeted pellet composition of the concentrate was 10 weight % glass flake additive/90% bisphenol-A polycarbonate. The formulations of the examples in this application are listed in FIG. 4. With respect to the data provided in FIG. 4 it should be noted that:

Phosphorous acid was added to each formulation (1.5 ppm of phosphorous acid) containing S-PC copolymer resins. along with 0.06 parts of tris(2,4-di-t-butylphenyl) phosphite stabilizer.

Si-PC is a polysiloxane-polycarbonate coplymer resin with 6.2 weight % dimethylsiloxane units and weight averaged molecular weight targeted at 23,000 (as measured by gel permeation chromatography using polycarbonate standards).

PC 1 is a BPA polycarbonate with a weight average molecular weight targeted at 22,000 (as measured by gel permeation chromatography using polycarbonate standards).

PC-2 is a BPA polycarbonate resin with a weight averaged molecular weight targeted at 30,000 (as measured by gel permeation chromatography using polycarbonate standards).

PC-3 is a BPA polycarbonate resin with a weight averaged molecular weight targeted at 17,700 (as measured by gel permeation chromatography using polycarbonate standards).

Examples 1-9 and comparative examples 1*-4* were prepared from the formulations listed in FIG. 4. Examples 1-4 particularly illustrate the unexpected impact behavior of metal-oxide coated glass platelet compositions at low temperature. The impact performance showed an unusual and dramatic dependence on % dimethylsiloxane contents at a constant 0.5 weight % metal oxide-coated glass flake platelets such that 0% ductility is observed at 3.5% dimethylsiloxane content, 100% ductility is observed at 5% dimethylsiloxane content in the composition and only 40% ductility at 6% dimethylsiloxane content in the composition. The results are reported in in a table, which is FIG. 1 and platted on a graph, which FIG. 2, versus a series of polysiloxane-polycarbonate copolymer resins without metal-coated glass platelets present. No such dramatic dependence is observed for the polysiloxane-polycarbontate copolymer resin in the comparative examples in the absence of the metal-oxide coated glass platelets. Examples 5-8 illustrate the sensitivity of the compositions of the present invention to the weight % of metal-oxide coated glass platelets at a fixed weight % of 3.5 weight % polydimethylsiloxane in the formulation. Example 9 and comparative example 5* illustrate that the % ductility of the compositions of the present invention also can depends on the melt flow, which is related to the molecular weight of the polysiloxane-polycarbonate copolymer resin.

Prophetic Example 10. Silver coated glass flake particles with an average size of about 90 microns and a thickness of about 5 microns (Microglas® Methashine® MC5090PS, commercially available from Nippon Glass Fiber Co. Ltd, Japan) could be mixed with a polycarbonate-siloxane copolymer resin formulations as in examples 1-9 to form, after extrusion and molding, a thermoplastic article with a highly glittery effect and with similar properties to examples 1-9.

We claim:

1. A polycarbonate composition comprising a polycarbonate-polysiloxane copolymer resin and a metal oxide-coated glass platelet additive wherein the polycarbonate-polysiloxane copolymer resin has a silicone content in the range of from more than 3.5 weight % to 7 weight % based on the total weight of the polycarbonate composition, the polycarbonate-polysiloxane copolymer has a haze of less than 10%, the glass flake additive is present in the range of 0.35 weight % to 0.70 weight % based on the total weight of the polycarbonate composition, and wherein the silicone content and glass flake additive weight are sufficient such that the composition is at least 40% ductile at −20° C., and wherein the polycarbonate-polysiloxane resin is produced from a polysiloxane of structure 1:

structure 1

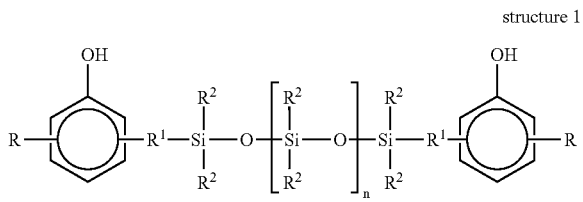

wherein each R may be the same or different and is selected from the group of radicals consisting of hydrogen, halogen, $C_{(1-8)}$ alkoxy, $C_{(1-8)}$ alkyl and $C_{(6-13)}$ aryl, $R_1$ is a $C_{(2-8)}$ divalent aliphatic radical, $R^2$ is selected from the same or different $C_{(1-13)}$ monovalent organic radicals, and n is an integer greater than or equal to 20 to 100.

2. The composition of claim 1, which further comprises a second thermoplastic resin.

3. The composition of claim 2, wherein the polycarbonate-polysiloxane copolymer resin is present in the range of from 98 weight % to 30 weight % based on the total weight of the polycarbonate composition.

4. The composition of claim 2, wherein the second thermoplastic resin is bisphenol-A polycarbonate resin.

5. The composition of claim 4, wherein the polycarbonate composition comprises from 98 total weight % to 30 total weight % of the polycarbonate-polysiloxane resin.

6. The composition of claim 1, wherein n is an integer from 30 to 60.

7. The composition of claim 6, wherein the polysiloxane resin of structure 1 is prepared from eugenol or allyl phenol.

8. The composition of claim 1 wherein the metal oxide coated glass platelet additive comprises calcium sodium borosilicate having a metal oxide coating.

9. The composition of claim 8 wherein the metal oxide coating is selected from the group consisting of titanium dioxide, tin oxide and iron oxide and mixtures thereof.

10. The composition of claim 8, wherein the metal oxide-coated glass platelet additive has an average aspect ratio of from 3:1 to 80:1.

11. The composition of claim 8, wherein the metal oxide-coated glass platelet additive has an aspect ratio of from 10:1 to 30:1.

12. The composition of claim 1, wherein the polycarbonate-siloxane resin has a silicone content of from 4 weight % to 7 weight % based on the total weight of the polycarbonate composition.

13. A polycarbonate composition comprising a polycarbonate-polysiloxane copolymer resin and a metal-coated glass platelet additive wherein the polycarbonate-polysiloxane copolymer resin has a silicone content in the range of from more than 3.5 weight % to 7 weight % based on the total weight of the polycarbonate composition, the polycarbonate-polysiloxane copolymer has a haze of less than 10%, wherein the metal-coated glass platelet additive is present in the range of 0.35 weight % to 0.70 weight % based on the total weight of the polycarbonate composition, and wherein the silicone content and metal-coated glass platelet additive weight are sufficient such that the composition is at least 40% ductile at −20° C., and wherein the polycarbonate-polysiloxane resin is produced from a polysiloxane of structure 1:

structure 1

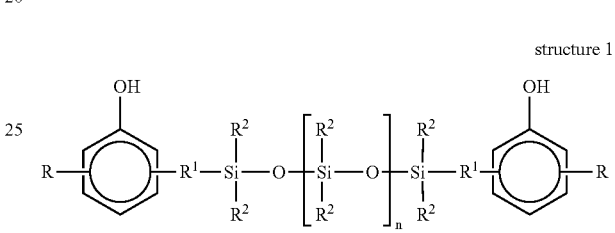

wherein each R may be the same or different and is selected from the group of radicals consisting of hydrogen, halogen, $C_{(1-8)}$ alkoxy, $C_{(1-8)}$ alkyl and $C_{(6-13)}$ aryl, $R^1$ is a $C_{(2-8)}$ divalent aliphatic radical, $R^2$ is selected from the same or different $C_{(1-13)}$ monovalent organic radicals, and n is an integer from 30 to 60.

14. The composition of claim 13, wherein the metal-coated glass platelet additive comprises one or more metals selected from the group consisting of gold, silver, platinum, nickel, copper, chromium zinc and alloys thereof.

15. An article formed from the composition according to claim 1.

16. An article formed from the composition according to claim 13.

* * * * *

UNITED STATES PATENT AND TRADEMARK OFFICE
CERTIFICATE OF CORRECTION

PATENT NO. : 7,649,032 B2
APPLICATION NO. : 11/015274
DATED : January 19, 2010
INVENTOR(S) : Ermi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1432 days.

Signed and Sealed this

Twenty-third Day of November, 2010

David J. Kappos
*Director of the United States Patent and Trademark Office*